(12) United States Patent
Oliver et al.

(10) Patent No.: US 10,893,596 B2
(45) Date of Patent: Jan. 12, 2021

(54) WIRELESS CONTROLLER FOR A LIGHTING FIXTURE

(71) Applicant: RAB Lighting Inc., Northvale, NJ (US)

(72) Inventors: Jason Lawrence Oliver, Northvale, NJ (US); Yanning Qu, Northvale, NJ (US); Robert Shusko, Northvale, NJ (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 16/355,281

(22) Filed: Mar. 15, 2019

(65) Prior Publication Data

US 2019/0289701 A1    Sep. 19, 2019

Related U.S. Application Data

(60) Provisional application No. 62/643,256, filed on Mar. 15, 2018.

(51) Int. Cl.
| | | |
|---|---|---|
| *H05B 47/19* | (2020.01) | |
| *H05B 45/10* | (2020.01) | |
| *H05B 45/37* | (2020.01) | |

(52) U.S. Cl.
CPC .......... *H05B 47/19* (2020.01); *H05B 45/10* (2020.01); *H05B 45/37* (2020.01)

(58) Field of Classification Search
CPC ............ H05B 37/0272; H05B 33/0815; H05B 33/0845; H05B 47/19; H05B 45/10; H05B 45/37; H05B 45/50

See application file for complete search history.

(56) References Cited

U.S. PATENT DOCUMENTS

| | | | |
|---|---|---|---|
| 7,233,831 | B2 | 6/2007 | Blackwell |
| 7,332,877 | B2 | 2/2008 | Crodian et al. |
| 7,734,356 | B2 | 6/2010 | Cleland et al. |
| 8,035,320 | B2 | 10/2011 | Sibert |
| 8,111,008 | B2 | 2/2012 | Veskovic et al. |

(Continued)

FOREIGN PATENT DOCUMENTS

| | | |
|---|---|---|
| CN | 201571228 | 9/2010 |
| CN | 202454176 | 9/2012 |

(Continued)

*Primary Examiner* — Daniel D Chang

(74) *Attorney, Agent, or Firm* — Frost Brown Todd LLC; Dennis S. Schell; Kevin C. Oschman

(57) ABSTRACT

An illustrative wireless controller for a lighting fixture includes an actuator module, a control module, and optionally a sensor module. The control module includes a radio, an antenna, a user interface, and a controller. A control housing defines an enclosure for the control module and defines a male fitting for mounting the control housing to an opening defined through the light fixture housing. The actuator module includes an AC-to-DC converter, a power monitoring circuit, a load switching circuit, and a dimming control circuit. An actuator housing defines an enclosure for the actuator module and for mounting the actuator housing inside the fixture housing. The control module receives wireless lighting control signals, decodes the wireless lighting control signals, and controls the actuator module based on at least the decoded wireless lighting control signals, to control the electrical power supplied by a power converter to a lighting fixture lamp.

25 Claims, 10 Drawing Sheets

(56) References Cited

U.S. PATENT DOCUMENTS

| | | |
|---|---|---|
| 8,228,163 B2 | 7/2012 | Cash et al. |
| 8,670,873 B2 | 3/2014 | Shloush et al. |
| 8,954,170 B2 | 2/2015 | Chemel et al. |
| 9,241,392 B2 | 1/2016 | Chemel et al. |
| 9,295,144 B2 | 3/2016 | Bora et al. |
| 9,392,675 B2 | 7/2016 | Taipale et al. |
| 9,629,220 B2 | 4/2017 | Panopoulos et al. |
| 9,791,117 B2 | 10/2017 | Rapeanu et al. |
| 2009/0273286 A1 | 11/2009 | Veskovic et al. |
| 2012/0044350 A1* | 2/2012 | Verfuerth ............. H05B 47/105 348/143 |
| 2012/0136485 A1 | 5/2012 | Weber et al. |
| 2014/0300294 A1 | 10/2014 | Zampini, II et al. |
| 2015/0373813 A1 | 12/2015 | Nieuwlands |
| 2016/0215933 A1 | 7/2016 | Skelton et al. |
| 2017/0280538 A1 | 9/2017 | Barna et al. |
| 2018/0035504 A1 | 2/2018 | Konishi et al. |
| 2018/0168021 A1* | 6/2018 | Isaacs ....................... B25F 5/02 |

FOREIGN PATENT DOCUMENTS

| | | |
|---|---|---|
| CN | 203615226 | 5/2014 |
| CN | 204948437 | 1/2016 |
| EP | 1725994 | 11/2006 |
| EP | 3132195 | 10/2017 |
| WO | 0030409 | 5/2000 |
| WO | 2017024268 | 2/2017 |
| WO | 2017040729 | 3/2017 |
| WO | 2018009785 | 1/2018 |

\* cited by examiner

WIRELESS CONTROLLER FOR A LIGHTING FIXTURE

CROSS-REFERENCE TO RELATED APPLICATIONS

This application claims the benefit of U.S. Provisional Application No. 62/643,256, filed Mar. 15, 2018 and titled "WIRELESS CONTROLLER FOR A LIGHTING FIXTURE," the entirety of which is hereby incorporated herein by reference.

FIELD OF THE INVENTION

The present invention relates to control of lighting fixtures, and particularly, to a wireless controller for a lighting fixture.

BACKGROUND

Wireless control of lighting fixtures is an increasingly desirable feature for some lighting installations. One prior art solution mounts a wireless controller externally on the outside of the lighting fixture, for example, to knock-out or other thru hole defined by an exterior wall of a lighting fixture housing; however, a larger than desired controller housing size extending from the fixture housing results when including a number of preferred components, including, for example, a sensor, e.g. an occupancy sensor or photocell. Additionally, if a sensor is included, the desired location on the fixture housing for a sensor, is often not the same location required for the antenna. Another prior art solution installs a wireless controller internally in the lighting fixture housing; however, unless a remote antenna is externally mounted, typical metal lighting fixture housings will block RF radio communication. Additionally, existing light fixtures may not provide the space and/or heat dissipation requirements for located a wireless controller in the interior of the lighting fixture housing.

The object of this invention is to provide a more flexible and improved arrangement for locating a wireless controller with a lighting fixtures.

SUMMARY

The present invention may comprise one or more of the features recited in the attached claims, and/or one or more of the following features and combinations thereof.

A wireless controller for a lighting fixture includes separate modules, an actuator module, a control module, and optionally, a sensor module. The control module is enclosed in a control housing. The actuator module is optionally enclosed in an actuator housing. The actuator module is located within the lighting fixture housing and is electrically coupled the power converter to provide on/off and/or dimming control of the lamp, for example, using a mechanical or solid state relay. The actuator module may also include a power monitoring circuit for monitoring voltage and/or current for the lamp or power converter of the lighting fixture.

The control module is mounted to an exterior of the fixture housing, is electrically coupled to the actuator module, and includes a radio receiver or transceiver, an antenna, an optional user interface, and a controller, e.g. a processor. The control module receives wireless lighting control signals, for example, from a local lighting control system, for example, via a wireless mess network, decodes the wireless lighting control signals, and controls the actuator module based on the user interface and the decoded wireless lighting control signals.

The wireless controller optionally also includes a sensor module also mounted to an exterior wall of the fixture housing. The sensor module is electrically coupled to the control module to provide sensor signals which the control module uses with the decoded wireless lighting control signals to control the actuator module. For example, the sensor could be a PIR occupancy sensor or dusk/dawn photo detector.

The actuator module and the sensor module can each mounted in holes defined through an outer wall of the lighting fixture, e.g. conduit knockout or threaded conduit outlets, to allow electrical connection with the actuator module located on the interior of the housing.

A key advantage of the illustrative wireless controller according to the present invention over prior art wireless controllers for a lighting fixture is that the controller comprises separate modules that can each be directly mounted with the fixture housing, but that are provided in separate housings, so that the size and mounting locations of the modules can be more selectively and independently determined. Despite being separate, the modules are not independent and are all electrically interconnected, removing redundancy of functions and components, thereby reducing cost and size.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

Figure 1:
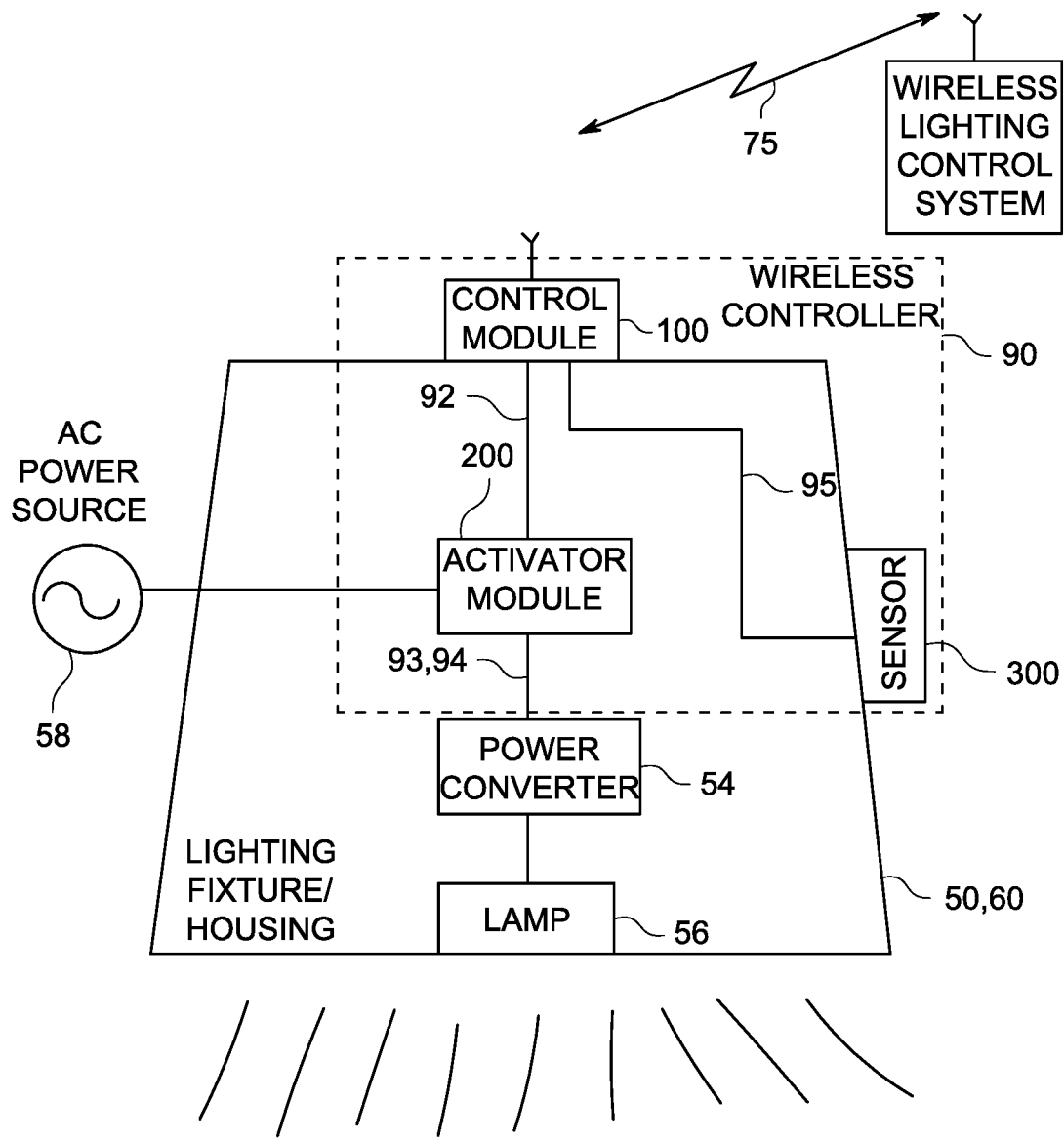
FIG. 1 is a schematic block diagram of an illustrative lighting controller and lighting fixture according to the present invention.

For the purposes of promoting and understanding the principals of the invention, reference will now be made to one or more illustrative embodiments illustrated in the drawings and specific language will be used to describe the same.

Figure 2:
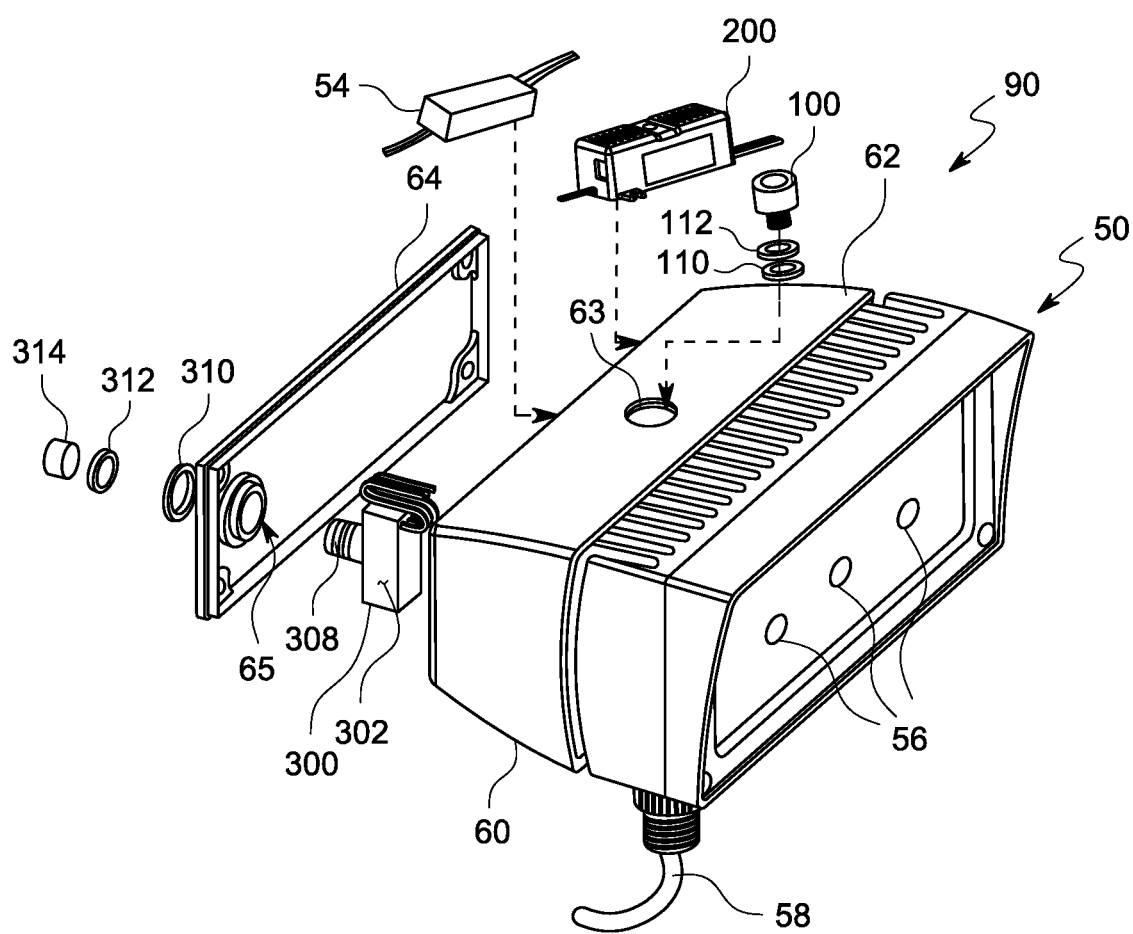
FIG. 2 is an exploded perspective view of the lighting controller and lighting fixture of FIG. 1.

Referring to FIGS. 1 and 2, an illustrative lighting controller 90 for a lighting fixture 50 includes a control module 100, an actuator module 200, and optionally, a sensor module 300. A prior art lighting fixture 50 associated with the illustrative lighting controller includes a fixture housing 60, a power converter 54, a lamp (light source) 56, for example, one or more LEDs, and an AC power source 58. Advantageously, for illustrative embodiment of lighting controller 90 and lighting fixture 50, the control module 100 and sensor module 300 are mounted to exterior walls 62 and 64 of fixture housing 60, and the power converter 54 and actuator module 200 are located inside of and enclosed by fixture housing 60.

Referring to FIG. 1, the AC power source 58 provides electrical power to actuator module 200. Actuator module 200 provides dimming and/or load switching for lamp 56, including supplying electrical power, for example, AC power, to power converter 54, which powers lamp 56. Control module 100 receives power from and controls the load switching and/or dimming provided by the actuator module 200. Control module 100 also communicates wirelessly with a local lighting control system 70. Optional sensor module 300 provides sensing information to control module 100. The sensing information can be used by control module 100 to determine dimming and/or load switching, for example, sensing information from one or more of a PIR sensor, photodetector, microphone, or other sensors known in the art and associated with lighting control.

Referring to FIG. 2, prior art lighting fixture 50 includes a fixture housing 60, which comprises one or more connected housing portions to enclose and mount various components of the lighting fixture. The material forming fixture housing 60 for commercial lighting is generally cast aluminum, which withstands heat and environmental conditions well, and dissipates heat rapidly; however, other metal and non-metal materials may be alternatively used. The fixture housing 60 is supplied with AC power source 58, for example 120 VAC, and is adapted for mounting of lamp(s) 56 and power converter(s) 54, for example, a driver, ballast, or other power supply for lamp 56. Power converter 54 is generally enclosed by fixture housing 60; however, in some embodiments it may be located on an exterior of fixture housing 60 (not shown). In typical prior art lighting fixtures 60, the lamp 56 is coupled directly to the AC power source 58, or through a sensor that provides load switching, for example, a dusk/dawn photodetector (not shown).

The fixture housing 60 may be provided with one or more knockouts or conduit outlets 63 and 65, for example, defined on a top exterior wall 62 of housing so and a back exterior wall 64, which in this particular example defines a removable housing cover. The conduit outlets 63 and 65 may optionally define threads for mounting, for example, one-half inch NPT. In one embodiment, the outlet 63 and 65 may comprise a socket that includes mechanical and electrical connecting features, for example, a standard 5/7 pin twist-lock NEMA socket. The outlets 63 and 65 may also be located on other surfaces of the fixture housing 60, including more than one outlet 63 and 65 located on the same surface. Typically, outlets 63 and 65 will be located so that the control module 100 can be located and oriented to provide effective wireless conductivity, for example, with local lighting control system 70, and possibly for user accessibility, and the optional sensor module 300 will be located to provide best detection for the objective of the sensing.

Figure 4A:
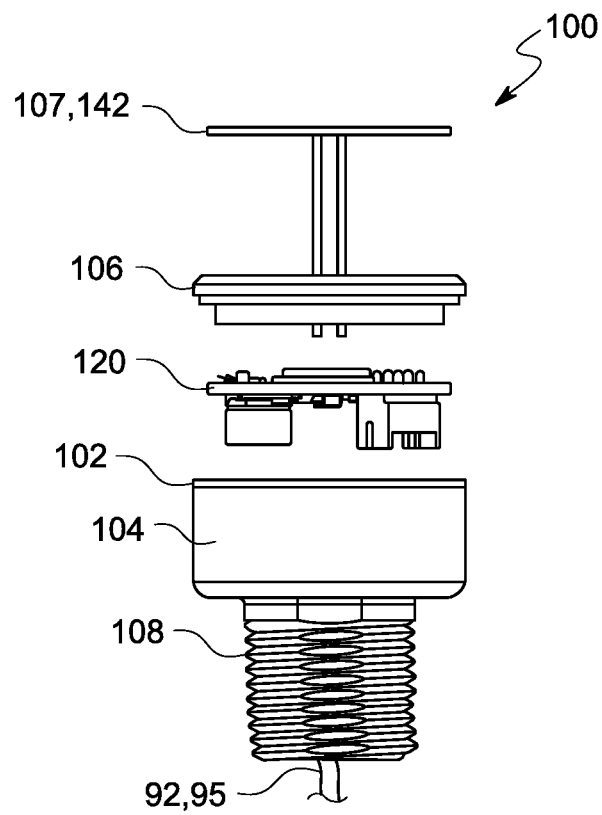
FIG. 4A is an exploded view of a first embodiment of a control module of the lighting controller of FIG. 1.
Figure 4B:
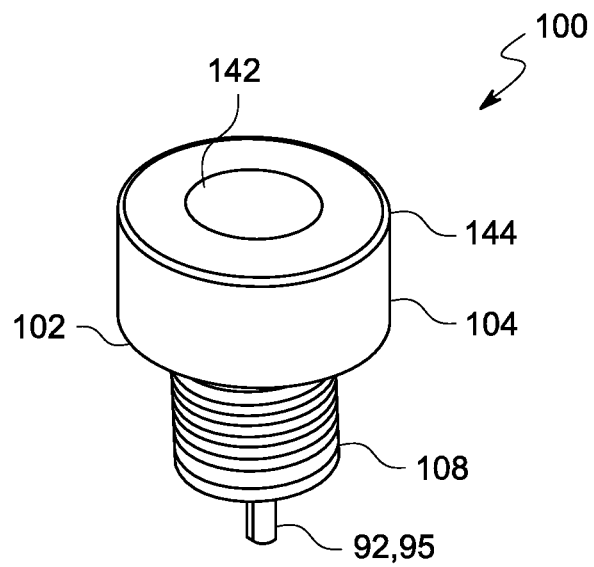
FIG. 4B is a perspective view of the first embodiment of a control module of FIG. 4A.

Referring to FIGS. 1, 4A, and 4B, the control module 100 includes an illustrative housing 102, sealingly enclosing a circuit board 120. The illustrative housing 102 includes a cylindrical body portion 104, a cover portion 106, and an attachment fitting 108. The cover portion 106 may define a lightpipe at an outer circumference, which one or more indicator LED discussed further below illuminates. The cover portion 106 may also include an associated switch membrane 107 for input switch 142 of user interface 140, discussed further below.

In the illustrative embodiment, attachment fitting 108 is a threaded male fitting, for example, a one-half inch NPT that can be threadably mated with threaded outlet 63 or 65. Alternative structures for mounting a device to the exterior of a fixture housing 60 that are known in the art may be substituted; however, a threaded male attachment fitting 108 is advantageous in that it allows wired electrical connections 92, 95 to pass from circuit board 120 centrally through fitting 108 and into the interior of the fixture housing. Also advantageous is that a threaded male attachment fitting 108 can easily be attached and/or removed from knockout or threaded outlet 63 or 65 and provide a watertight seal using, for example, elastomeric gasket 110 and locking nut 112 (FIG. 2) on an exterior and/or interior of exterior wall 62, in part depending on whether the outlet is a matching threaded outlet or a clearance hole, for example, a knockout. Advantageously, control housing body portion 104 extending outside of the lighting fixture housing 60 has a very small profile. For example, the diameter of the cylinder shaped body portion 104 is slightly larger than the outlets 63 and 65, for example, 1.375 inches, and the length is less than the diameter, for example, 0.75 inches.

Figure 5A:
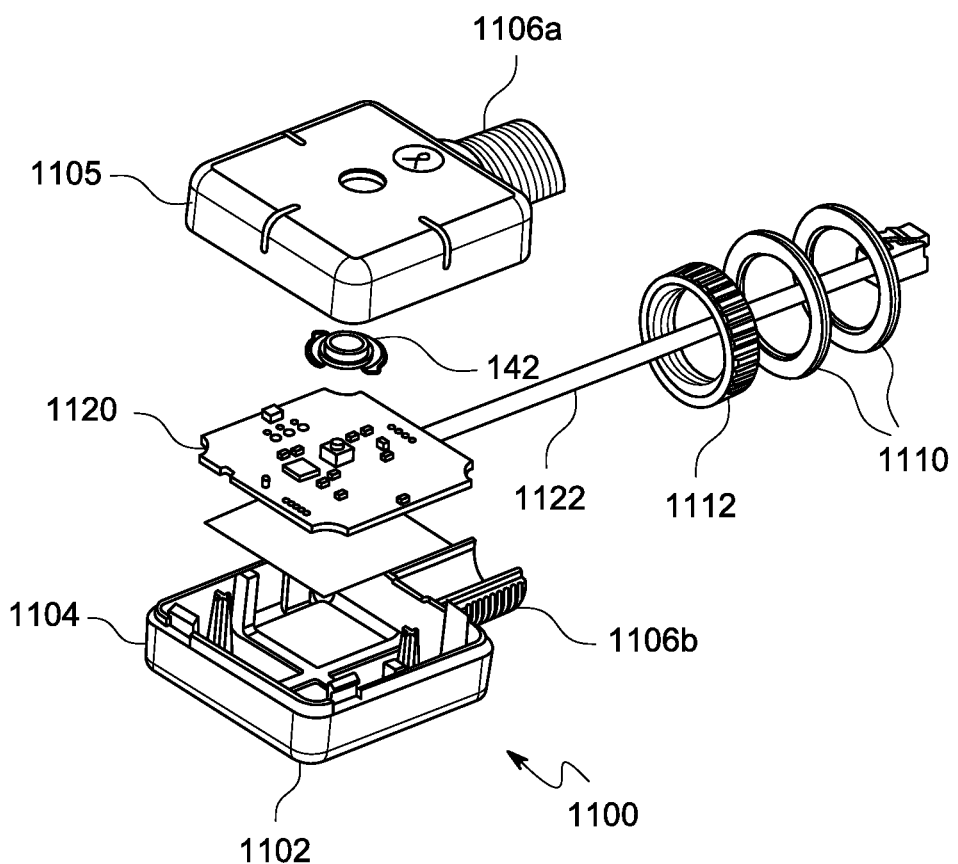
FIG. 5A is an exploded view of a second embodiment of a control module of the lighting controller of FIG. 1.
Figure 5B:
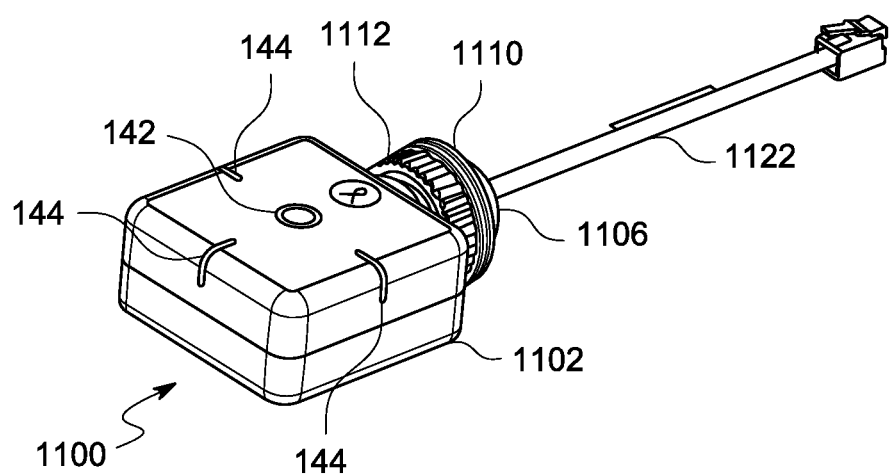
FIG. 5B is a perspective view of the second embodiment of a control module of FIG. 5A.

An alternative embodiment of control module 1100 is shown in FIGS. 5A and 5B, including the various features discussed for control module 100 above, but the control housing 1102 is rectangular box shaped rather than cylindrical, and in the illustrative embodiment, is larger than control housing 102. The illustrative housing 1102 includes a body portions 1104 and 1105, that sealingly encloses circuit board 1120, and an attachment fitting 1106. In the illustrative embodiment, attachment fitting 1106 is a threaded male fitting, for example, a one-half inch NPT that can be threadably mated with threaded outlet 63 or 65. Alternative structures for mounting a device to the exterior of a fixture housing 60 that are known in the art may be substituted.

Sensor module 300 may also be attached to one of the outlets 63 or 65 in the same ways described for control module 100. Alternatively, as shown in FIG. 2, sensor module 300 may be located in part inside the interior of enclosure 60, with a projecting end 308, for example, and attachment fitting including a sensor, extending through the outlet 65 to the outside of exterior wall 64, for example, using elastomeric gasket 310, locking nut 312, and protective cover 314 that is received by a threaded portion of the projecting end 308. In one illustrative embodiment the control module 300 may also be located in part inside of the interior of enclosure 60, with a projecting end, for example, including an antenna and/or user interface, extending through the outlet 63 of exterior wall 62, similar to that discussed above and illustrated in FIG. 2 for sensor module 300.

Figure 6A:
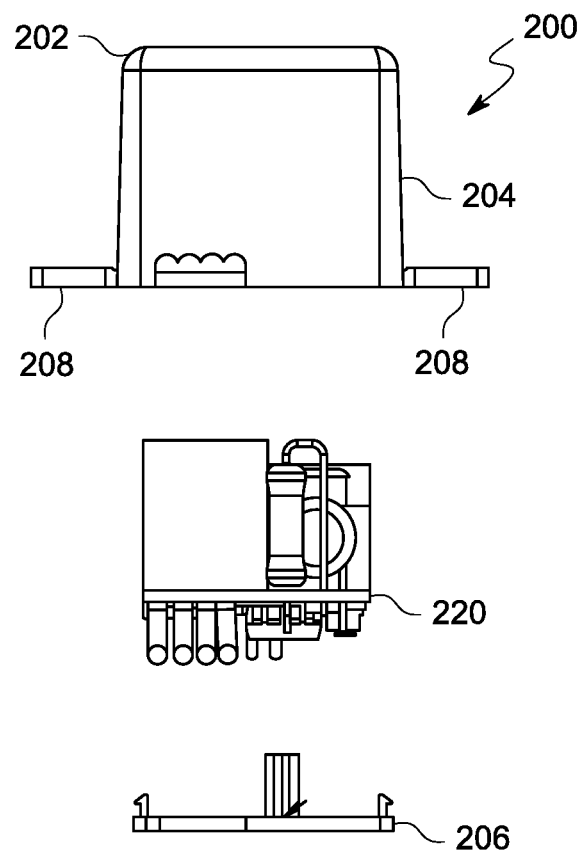
FIG. 6A is an exploded view of a actuator module of the lighting controller of FIG. 1.
Figure 6B:
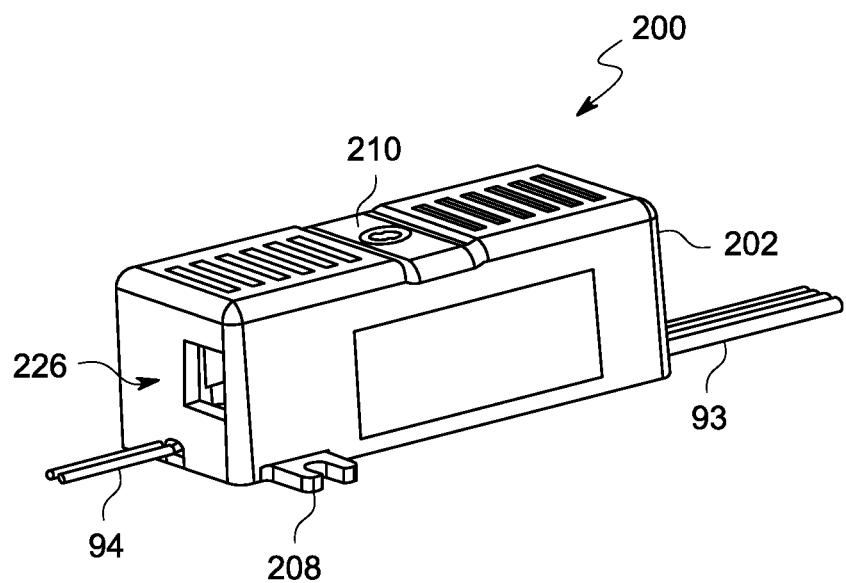
FIG. 6B is a perspective view of the first embodiment of an actuator module of FIG. 6A.

Referring to FIGS. 2 and 6A, the actuator module 200 includes an illustrative housing 202, enclosing a circuit board 220. The illustrative actuator housing 202 includes a rectangular body portion 204 and a cover portion 206. In the illustrative embodiment, mounting features of the illustrative actuator housing 202 include mounting tabs 208, for example, with enclosed or slotted holes defined therethrough, to allow fasteners to secure the actuator housing 202 to a surface or post defined by the fixture housing 60. An additional or alternative mounting feature is a strap recess 210 defined by body portion 204. The strap recess 210 is shaped to receive a mounting strap (not shown) that is secured to fixture housing 60, thereby preventing the housing 202 from slipping from the mounting strap. Alternative structures for mounting a device to the interior or exterior of a fixture housing 60 that are known in the art may be substituted.

The control housing 102 for control module 100, sensor housing 302 for sensor module 300, and actuator housing 202 for actuator module 200 may be molded from known thermoplastics, for example, RoHS compliant modified polyphenylene ether (PPE) resins consisting of amorphous blends of polyphenylene ether and polystyrene, or other known plastic or non-plastic materials. Advantageously, control housing 102, and optionally also actuator housing 202 and sensor housing 302 to enable external mounting, can provide a high level of protection against water and other particles, for example, satisfying IP66 protection rating for enclosures.

Figure 3:
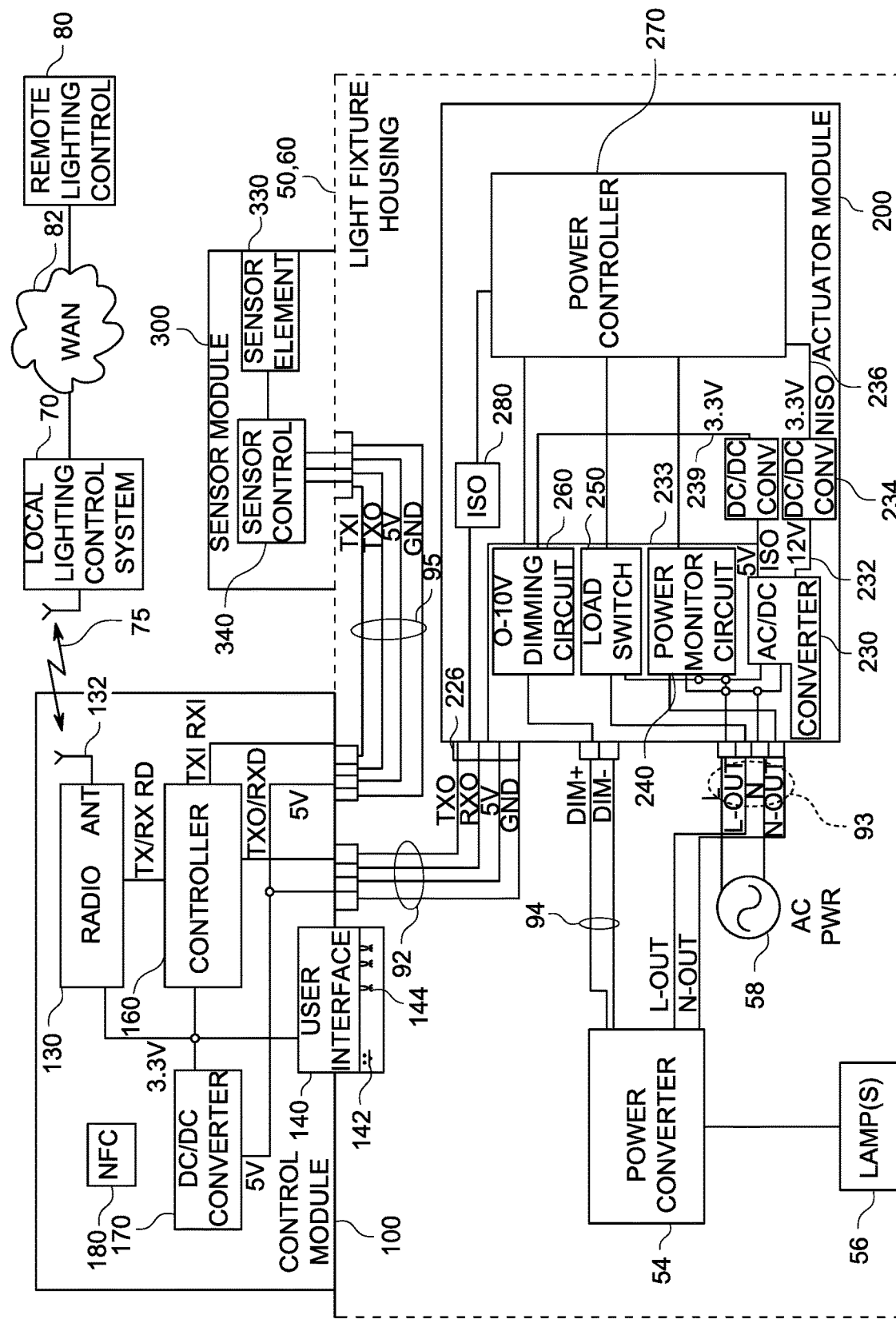
FIG. 3 is a schematic block diagram of the lighting controller of FIG. 1.

Referring to FIG. 3, an illustrative electrical schematic block diagram for the wireless controller 90 and lighting fixture 50 is shown. A key advantage to the electrical design is that the division of functions and components between the modules 100, 200, and 300, provides advantages in physical form and function. For example, power and switching functions associated with the power converter 54 are collected into the actuator module 200 and can be located inside the lighting fixture housing 60, for example, in proximity with the power converter 54. In one embodiment, a combined actuator module 200 and power converter 54 may be provided on a single circuit board or within a single housing. By way of further example, an AC-to-DC converter 230 of the actuator module provides DC power to the control module 100 and optionally to sensor module 300. Additionally, the radio 130, antenna 132, user interface 140, and controller 160 providing control processing functions for at least control module 100 and actuator module 200 are collected into the control module 100, advantageously providing a control housing 102 that contains the features that are advantageous to be mounted to an external wall 62 or 64 of the fixture housing 60. While in one embodiment of the wireless controller 90 a sensor 330 is included with the control module 200, by using a separate sensor module 300 in the illustrative embodiment of wireless controller 90, the sensor housing 302 can be selectively included or excluded, and if included, can be mounted in a location advantages for sensor 330 which may not be advantages for antenna 232 and/or user interface 240 of control module 200.

The illustrative actuator module 200 includes an AC-to-DC converter 230, a power monitoring circuit 240, a load switching circuit 250, a dimming control circuit 260, a power controller 270, and data communication isolation circuit 280. Other embodiments of actuator module 200 may exclude particular components depending on features required for the lighting fixture 50.

The illustrative AC-to-DC converter 230 is a flyback converter providing a primary side non-isolated 12V DC supply 232 and a secondary side isolated 5V DC supply 233. A DC-to-DC converter 234 provides a non-isolated 3.3V DC supply 236, and another DC-to-DC converter 238 provides an isolated 3.3V DC supply 239. The non-isolated DC supply 232 and 236 provide power for the load switching circuit 250 and power controller 270. Isolated 3.3V DC supply 239 powers the dimming circuit 260 and the data communication isolation circuit 280. Advantageously, the isolated 5V DC supply 233 can also power the control module 100 and sensor module 300.

The power controller 270 provides communication with the control module 100 via TX0/RX0 of wired connections 92, for using a UART serial connection, measurement from signals received from the power monitoring circuit 240, and control of load switch 250 and dimming circuit 260, in response to commands received from control module 200. The power controller 270 can be a mixed signal microcontroller, for example, MSP4301220 available from Texas Instruments, of Dallas, Tex. The load switch 250 can be a mechanical relay receiving AC power source L hot line and providing selectively switched L-out hot line to power converter 54 for powering lamp 56. In an alternative embodiment, load switching circuit 250 can include a semiconductor switch for switching the L hot line. The AC power source 58 is also coupled to N-out which is connected to the N neutral line of AC supply power 58 through a current sense resistor (not shown) of power monitoring circuit 240. In an alternative embodiment the load switching circuit 250 can switch the electrical connection between power converter 54 and lamp 56.

Power monitoring circuit 240 also provides AC supply voltage 58 L hot line and N neutral line to the power controller 270 for monitoring power and/or loss of AC power. The power monitoring circuit 240 and power controller 270 can also determine power factor. The dimming circuit 260 can receive a PWM driving signal from power controller 270 to provide a buffered dimming signal output via wired connections 94, for example, a standard 0-10V DC dimming signal, to power converter 54 for dimming the output of lamp 56. The data communication isolation circuit 280 can include opto-isolator to provide the PWM signal and TX0/RX0 signal from the non-isolated power controller 270 to isolated dimming circuit 250 and isolated control module 100.

The illustrative control module a radio 130, an antenna 132, an optional user interface 140, a controller 160, and an optional DC-to-DC converter 170. The radio 130 may be a receiver or a transceiver, for example, a single chip or module which may also include antenna 132, for example, an XBEE3 radio module, available from Digi International Inc., of Minnetonka, Minn., which provides mesh network communication based on the Zigbee Alliance standard. For example, the radio 130 may be used to wireless communicate with, control, and obtain power, status, and other operating information from a wireless lighting control system. For example, the wireless controller 90 may be in communication with, joined with, a local lighting control system 70, such as a local lighting control gateway, which may be connected via a wide area network 82, for example, a cellular network, to a remote lighting control system 80, for example, a wireless lighting control system such as that disclosed by US Patent Publication No. 20170280538, published Sep. 28, 2017 and titled Automated Commissioning for Lighting Control System, which is hereby entirely incorporated herein by reference, and in particular, the instant wireless controller 90 may additionally incorporate one or more features disclosed by the referenced patent publication for wireless controller devices.

The radio 130 can receives wireless lighting control signals, and alone or with controller 160, decode the wireless lighting control signals, and control the actuator module 200 based at least in part on the decoded wireless lighting control signals. The radio 130 can also receive and transmit power, impending power loss, and other status information from actuator module 200 and sensor information from sensor module 300 via controller 160. The radio 130 and controller 160 can communicate via a TX/RX RD communication, for example, a UART serial data connection. For example, for power loss detection, power controller 270 can detect success periods without an AC transition through zero volts, indicating loss of AC power source 58. The controller 160 can be configured to, upon receiving notification of detection of the loss of power from the power controller 270, send a radio message to the local lighting control system 70. To do so, a capacitive circuit of the wireless controller 90, for example associated with DC-to-DC power converter 170 or the 5V DC supply 233, maintains sufficient power to at least the components necessary to send this last radio transmission indicating power loss.

The controller 160 can also provide overall process control for the wireless controller 100, including not only based on control signal received from radio 130, but also based on input received from user interface 140 and power controller 270 of actuator module 200. For example, the controller 160 can be an embedded microcontroller, for example, ATSAMD20E16 available from Microchip Technology, Inc., of Chandler, Ariz. Controller 160 can provide data communication, for example UART serial communication, TX1/RX1 with a sensor control circuit 340 of sensor module 300, TX0/RX0 with power controller 270 of actuator module 200, and TX/RX RD with radio 130. Additionally, controller 160 can detect activation of switch 140 and control driving of LED indicators 144, both of user interface 140. Control module 100 may also include a DC-to-DC converter to receive the 5V DC supply from actuator module 200 and provide 3.3V DC supply for controller 160 and radio 130.

The switch 140 may be used for on/off control of lamp 56, and may provide other mode selection, for example, selecting device identification for highlighting the wireless controller 90 via software associated with local or remote lighting control system 70 or 80. For example, the switch 140 may be a momentary contact switch configured by controller 160 to perform various different functions depending on the length and/or number of times switch is depressed. For example, the switch 140 may be pressed twice within a predetermined period of time to toggle the lamp 56 ON/OFF. As another example, pressing the switch 140 twice and holding the switch in the actuated position may permit manual selection of a dim level for the lamp 56. As still another example, holding the switch 140 in the actuated position for 10 seconds may remove the wireless controller 90 from the network 75, such as, for example, the mesh network associated with local lighting control system 70. As a further example, the switch 140, which may include an LED, may be illuminated when the wireless controller 90 is powered on, and may blink for a predetermined period of time when the wireless controller 90 has been selected for device indication from software associated with one of lighting control systems 70 and 80. As yet another example, pressing and holding the switch 140 may result in the light fixture lamp 56 illumination changing, for example, ramping up and down.

LEDs 144 may include a status indicator, which may be a single LED (such as a multi-color LED, e.g., a Red/Green/Blue LED). According to one implementation, the status indicator of LEDs 144 may be green when connected to a wireless network 75, and may be blinking red when attempting to connect to a network. One of LEDs 144 can also be configured to alternate between two colors (e.g., green and red) when connection to the lighting control system 70 and/or the mesh network 75 is lost. One or more of LEDs 144 may be provided to function as a signal strength indicator, providing a visual indication of signal strength to, for example, the nearest device in the network 75.

In one embodiment of wireless controller 90, the control module 100 includes a near-field communication (NFC) chip 180 or other wireless tag known in the art to provide close proximity wireless identification of the wireless controller and/or lighting fixture 50 it is associated with, for example, during installation, commissioning, inventory, or troubleshooting.

The sensor module 300 includes sensor element 330 and sensor control circuit 340, which communicates via TX1/RX1 with the controller 160 to provide sensor signals which the control module 100 uses to control the actuator module 200, and or provide sensor information to local lighting control system 70. For example, the sensor could be a PIR occupancy sensor or dusk/dawn photo detector. In one embodiment of wireless controller 90, the sensor module 300 is not used to control the actuator module 200 but simply is collocated on the same lighting fixture with it and sensor state information is provided to local lighting control system 70 via radio 130.

In an alternative embodiment of the wireless controller 90, the sensor 330 is included in control module 100, mounted to or within control housing 102, and coupled to controller 160.

Advantageously, when a plurality of wireless controllers 90 are used in a lighting control system 70, the controllers 90 can be grouped together in banks and/or configured in other relationships to function together, for example, in a lead/follower relationship. For example, in a grouped bank of proximate lighting fixtures 50, only one lighting controller 90 may be configured as the lead and include a sensor module 50 and the other follower lighting fixtures in the group bank without a sensor module may have their wireless controllers configured to follow the on/off, dimming, or other setting of the lead lighting controller with a sensor module, thereby reducing cost and improving function.

Once the wireless lighting controller 90 has been installed with lighting fixture 50 and powered on, it may be commissioned, during which the controller enters the network 75 and is identified by the lighting control system 70 and 80. In at least one embodiment, the controller 90 being powered on will self-commission, greatly simplifying installation. For example, in at least one example embodiment, the lighting control system 70 and 80 self-commissions by automatically identifying itself.

Figure 7:
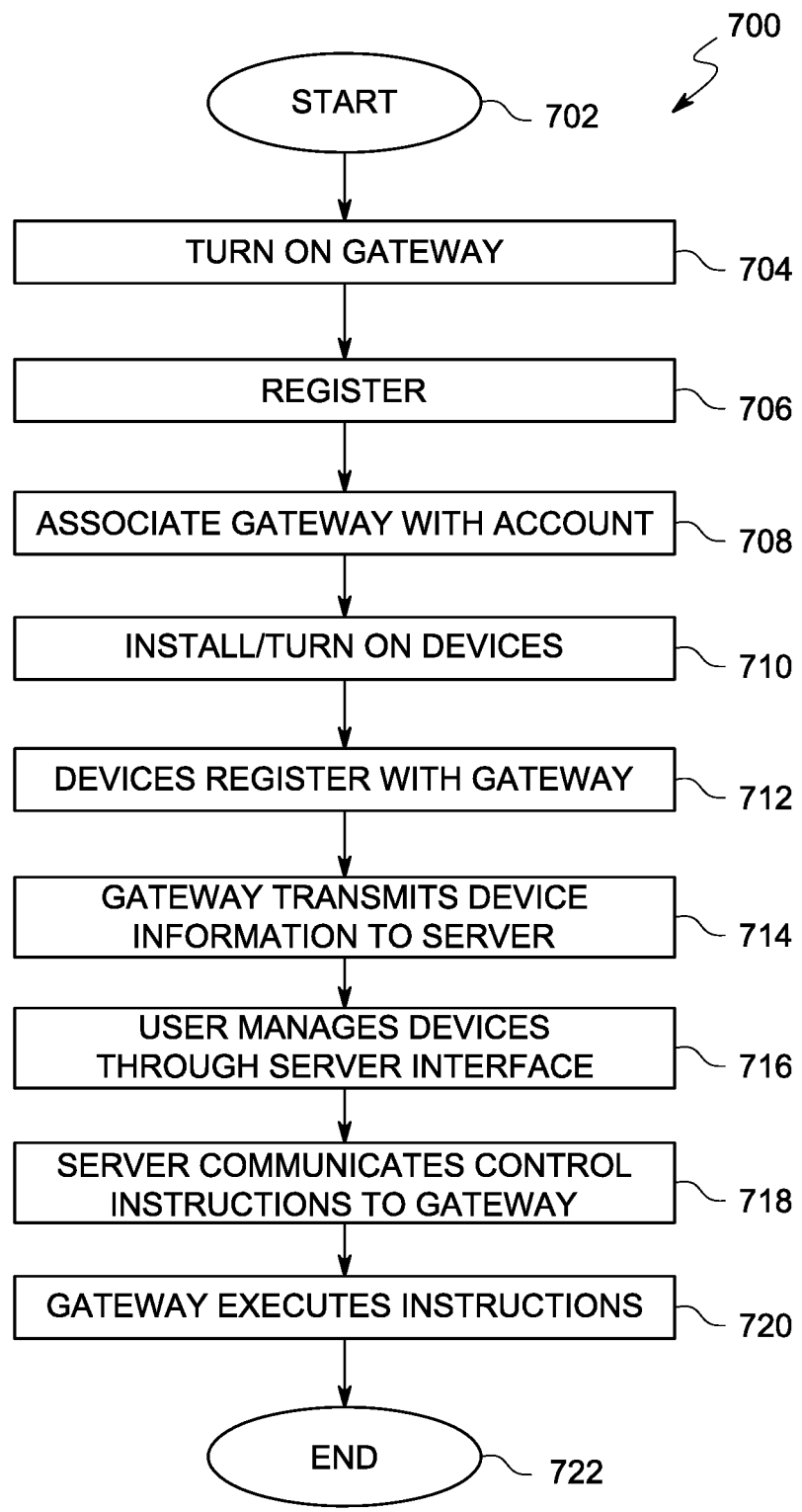
FIG. 7 is a flowchart representing an exemplary method for commissioning a the lighting controller of FIG. 1 with a local wireless control system.

FIG. 7 is a flowchart 700 representing an exemplary method for commissioning the lighting controller 90. The method begins at a START, step 702, and proceeds to a first step, shown at step 704, in which the local wireless lighting control system (e.g., a gateway) 70 is powered on. At step 706, registration occurs. In particular, a user, may access the lighting control system 70 and 80 using an appropriate interface, such as a web-based or native application, to register and/or create an installation/site/organizational account. Alternatively, an administrator may register users and create accounts. After registration, the local wireless lighting control system 70, may be associated with an account, at step 708. This may be accomplished by entering a unique identification number through the application, or other appropriate interface, or the local lighting control system 70 may be pre-configured with an association to an existing account.

With the association in place, the gateway portion of the local lighting control system 70 may appear on a user interface such as a user computer device communicating with system 70 or remote lighting controller 80. Lighting controller 90 may be programmed or otherwise designed such that upon power up it automatically attempts to register with the local lighting control system 70 after they are powered on, at steps 710 and 712. That is, when a lighting controller 70 is powered on, it wirelessly and automatically attempts to communicate with the gateway 70. In particular, the lighting controller identifies itself to the local lighting control system 70 and the local lighting control system 70 informs the remote lighting controller 80 of the wireless controller, at step 714. In some embodiments, and as described below for method 1200, the local lighting control system 70 may prevent new lighting controllers 90 from using the proprietary link key to join the network 75 unless a customer service representative and/or organization administrator has set the local lighting control system 70 to allow new devices to join.

After lighting controller 90 has joined the network 75 and registered with local lighting control system 70 and remote lighting controller 80, the user may then be able to manage lighting controller 80 through a user interface, at step 716, as will be discussed below. Users may have various levels of access and control with regard to a particular site and/or particular lighting controller. After configuration, the remote lighting controller 80 communicates control instructions to the local lighting control system 70, at step 718, and the wireless controller 90 may execute the instructions, at step 720. Updates provided by the user may be forwarded from the remote lighting controller 80 to the local lighting control system 70. In addition, the local lighting control system 70 may receive various information from the lighting controller 90, and may send, or relay, various updates to the remote lighting system 80. Ultimately, the method proceeds to an END, at step 722.

After the lighting controller 90 communicates with the local lighting control system 70 and the local lighting control system 70 communicates information about the lighting controller 90 to the remote lighting controller 80, the lighting controller 90 and associated lighting fixture 50 may be managed within a user interface. That is, for example, graphical and/or textual representations, of the lighting controller 90 and/or lighting fixture 50 may be displayed on a user interface of a user computer device, with status information and optional mode selections provided.

Figure 8:
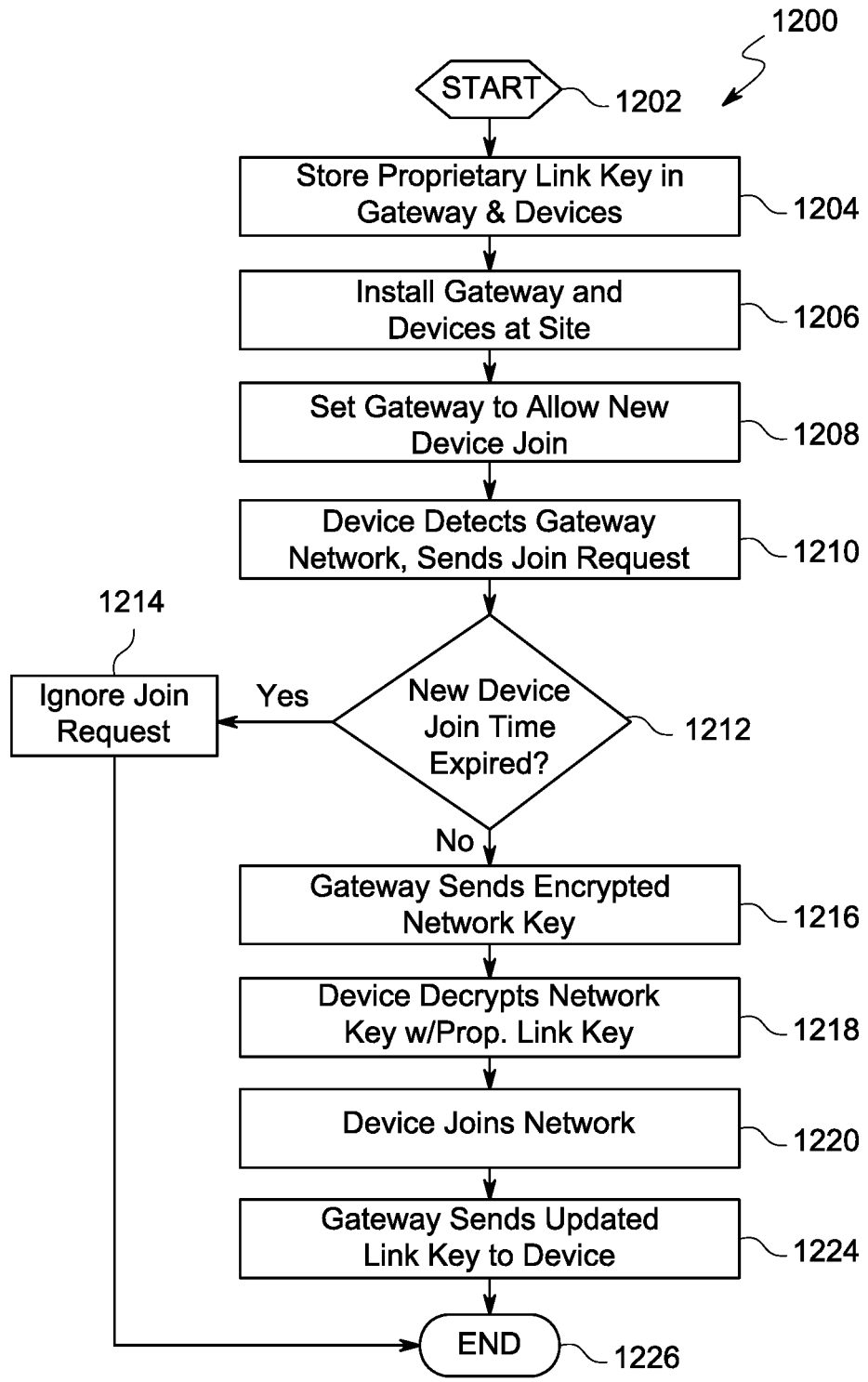
FIG. 8 is a flowchart representing an exemplary method for secure network join for the lighting controller of FIG. 1.

FIG. 8 is a flowchart representing an exemplary method for secure network join for the lighting controller of FIG. 1.

Referring to FIG. 8 an illustrative method 1200 of securing joining a new lighting controller 90 to the mesh network 75 of a site system is shown. Also referring to FIG. 3, the method 1200 are completed by various components of system, including for example, remote lighting controller 80, local lighting control system 70 (e.g., a gateway), lighting controller 90, and mesh network 75.

In step 1202 the method 1200 starts. In step 1204, proprietary link keys are stored in the trust center of local lighting control system 70, e.g. a gateway, and in each lighting controller 90, for example, in the control module 100. In step 1206, if not already completed, the local lighting control system 70 and/or lighting controller 90 are installed and powered. In step 1208, the local lighting control system 70 of the particular site system 14 is set to allow lighting controller 90 to join the mesh network 75 using the proprietary link key. For example, as shown in the exemplary screen capture of a device commissioning setting of a back-end user interface application, an add devices mode can be selected. Additionally, the mode can be optionally selected to expire after a specified period of time.

In step 1210, the lighting controller 90 detects the mesh network 75 of local lighting control system 70 and sends a join request in accordance with the mesh network protocol, e.g. Zigbee. In step 1212, if the new device join mode has expired, method 1200 continues at step 1214. In step 1214, the join request is ignored. If in step 1212 the device join mode has not expired, method 1200 continues to step 1216.

In step 1216, the local lighting control system 70 sends the current network key encrypted using the proprietary link key. In step 1218, the lighting controller 90 receives the encrypted network key and decrypts it using the proprietary link key. In step 1220, the lighting controller 90 joins the mesh network 75 using the current network key and the local lighting control system 70 registers the lighting controller 90. In step 1224, the local lighting control system 70 sends an update link key to the lighting controller 90 encrypted using the current network key. The updated link key is stored in the trust center of local lighting control system 70 and in the lighting controller 90, for example, control module 100. In step 1226, method 1200 is completed.

Figure 9:
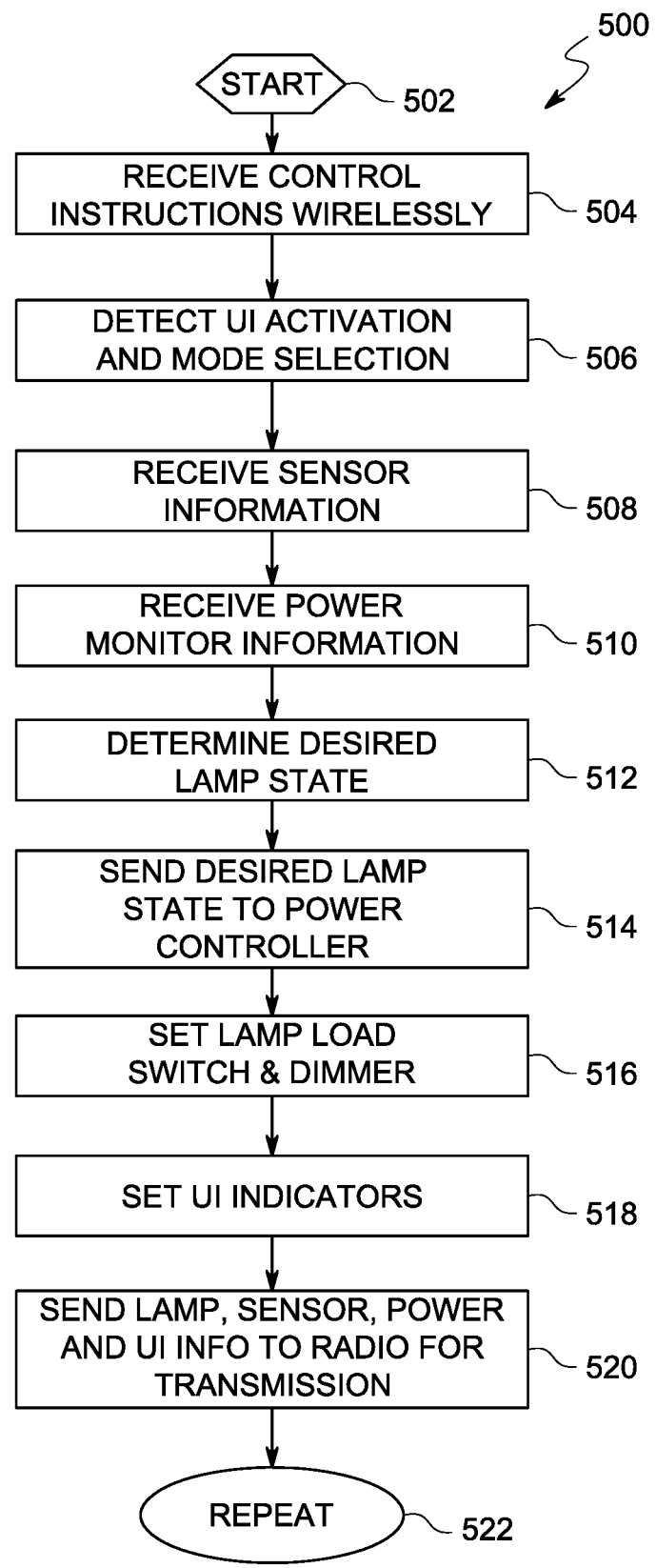
FIG. 9 is an illustrative flowchart of the lighting controller of FIG. 3.

Referring to FIG. 9, an exemplary method 500 of controlling lamp 56 is illustrated, which includes processing steps of controller 160, power controller 270, and sensor control circuit 340. The method 500 begins in step 502. In step 504, the controller 160 receives control instructions received by radio 130 from lighting control system 70 and 80. In step 506, the controller 160 detects switch 142 activation and/or mode selection from the user interface 140. In step 508, sensor control 340 detects sensor signal from sensor element 330 and sends sensor information to controller 160. In step 510, power controller 270 measure power information from power monitor circuit 240 and sends power information to controller 160. In step 512, the controller 160 determines the desired lamp state based on preselected settings and selected mode, and one or more of the received control instructions, user interface inputs, sensor information, and power information. In step 514, the controller 160 sends the desired lamp state to the power controller 270. In step 516 the power controller sets the load switching circuit 250 and dimming circuit 260 to achieve the desired state for lamp 56. In step 518, the controller 160 sets LED indicators 144 based on one or more of the status, mode, and desired state of the lighting controller 90. In step 520 the controller 160 sends status, mode, and desired state information for the lighting controller 90 to the radio 130 for transmission to lighting control system 70 and 80. In step 522, method 500 is repeated.

Figure 10:
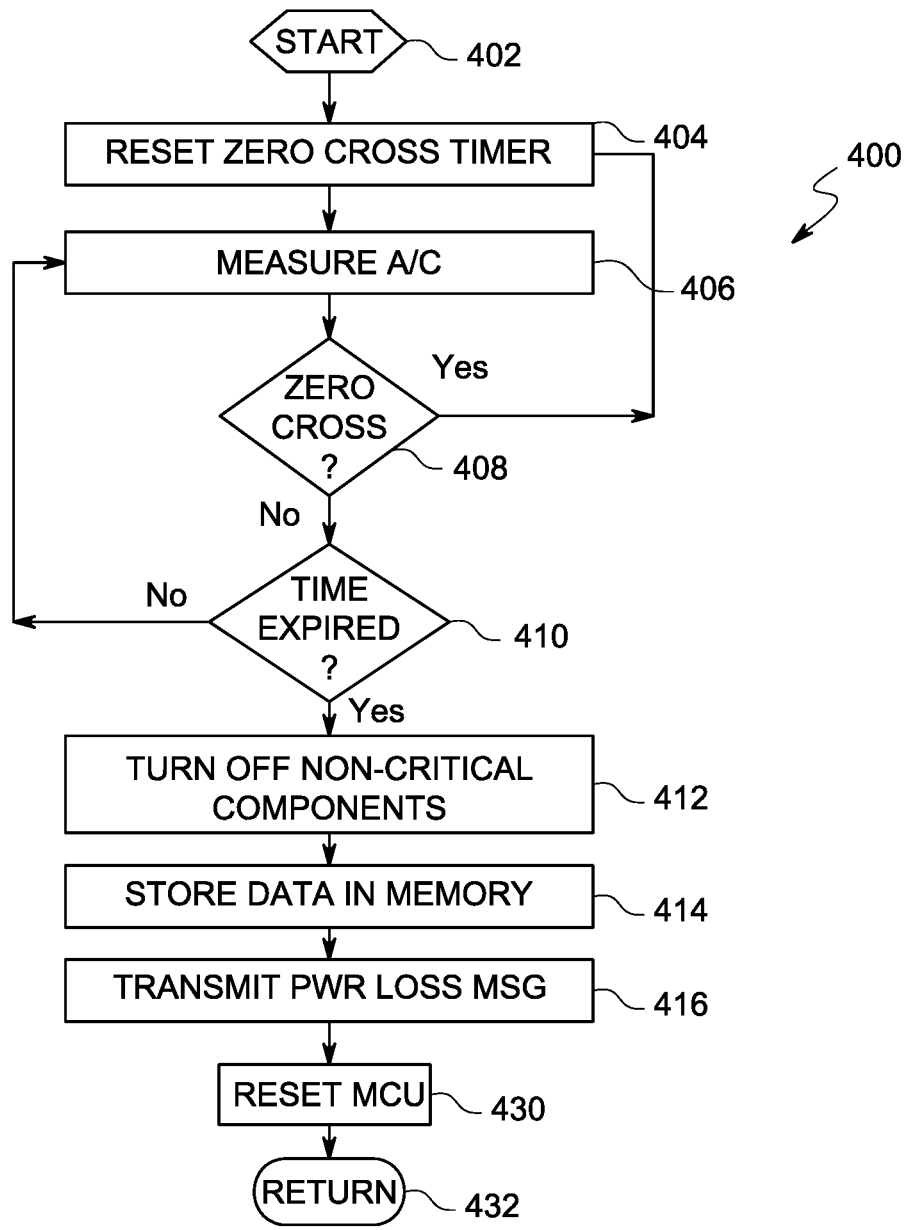
FIG. 10 is a flowchart representing an exemplary method of detecting and handling power loss for the lighting controller of FIG. 1.

Referring to FIG. 10, an exemplary method 400 of detecting and handling power loss is illustrated. The method 400 can be provided by controller 160 of control module 100 and power controller 270 of actuator module 100. The method 400 begins in step 402. In step 404, a zero cross timer is reset. In step 406, the voltage of the AC power signal at power monitor circuit 240 is measured. In step 408, it is determined whether the AC power is transiting zero volts, either ascending or descending. If a zero crossing is detected, method 400 continues at step 404. If zero crossing is not detecting, method 400 continues at step 410. In step 410, the power controller 270 determines if the zero cross timer is expired, for example, 20 msecs. has elapsed. If the timer is not expired, method 400 continues at step 406, else method 400 continues at step 412. In step 412, the power controller 270 and/or controller 160 can optionally turn off noncritical components to limit the drain of power from the capacitive power supply used for final radio transmission. In step 414, the power controller 270 and/or controller 160 store configuration and other data in solid-state storage, for example, in a flash memory device that retains data after power loss. In step 416, the controller 160 provides a power loss message to radio 130 to transmit to local lighting control system 70, e.g., a gateway, via mesh network 75. In step 430, the power controller 270 and/or controller 160 performs a soft reset, e.g., in order to continue the normal functioning in the event power is not lost. In step 432, the method 400 is complete.

While the invention has been illustrated and described in detail in the foregoing drawings and description, the same is to be considered as illustrative and not restrictive in character, it being understood that only illustrative embodiments thereof have been shown and described and that all changes and modifications that come within the spirit and scope of the invention as defined in the claims and summary are desired to be protected.

The invention claimed is:

1. A lighting fixture, comprising:
a fixture housing;
a lamp coupled with the fixture housing;
a power converter for supplying electrical power to the lamp, the power converter coupled with the fixture housing;
an actuator module having an actuator housing mounted inside the fixture housing, the actuator module electrically coupled to the power converter and including a power controller circuit for controlling electrical power supplied from the power converter to the lamp; and
a control module having a control housing mounted to an exterior of the fixture housing, the control module electrically coupled to the actuator module and including a radio, an antenna, and a controller; and
wherein the control module receives wireless lighting control signals, decodes the wireless lighting control signals, and the controller controls the actuator module based on at least the decoded wireless lighting control signals.

2. The lighting fixture of claim 1, wherein:
the control module further includes a user interface; and
the controller controls the actuator module based on at least the user interface and the decoded wireless lighting control signals.

3. The lighting fixture of claim 1, wherein:
the actuator module further includes an AC to DC converter; and
the AC to DC converter powers the actuator module and the control module.

4. The actuator module of claim 1, wherein the actuator module includes a load switching circuit to electrically couple one of electrical power to the power converter and the power converter to the lamp.

5. The lighting fixture of claim 1, wherein the actuator module includes a power monitoring circuit to monitor the power drawn by at least one of the lamp and the power converter.

6. The lighting fixture of claim 1, wherein the actuator module includes a dimming control circuit electrically coupled to a dimming input of the power converter.

7. The lighting fixture of claim 1, further comprising:
a sensor module mounted to an exterior of the housing, the sensor module electrically coupled to the control module to provide a sensor output signal; and
wherein the controller of the control module further controls the actuator module based on the sensor output signal.

8. The lighting fixture of claim 1, wherein a mounting hole is defined by an outer wall of the fixture housing and the control housing is mounted in the mounting hole, thereby allowing electrical connections with at least the actuator module.

9. The lighting fixture of claim 1, wherein the power converter includes a driver and the lamp is at least one LED.

10. The wireless controller of claim 1, wherein the actuator housing houses both the actuator module and the power converter.

11. The wireless controller of claim 10, wherein the actuator module and the power converter are provided on a single circuit board.

12. A wireless controller for a lighting fixture having a fixture housing, a lamp, and a power converter, the wireless controller comprising:
an actuator module including a first circuit board having a power controller circuit for controlling electrical power supplied by the power converter to the lamp, and wherein the actuator module is adapted for mounting inside the fixture housing;
a control module including a second circuit board having a radio, an antenna, and a controller, and wherein the control module is adapted for mounting to an exterior of the light fixture;
a first plurality of electrical wires connecting the control module and the actuator module; and
a second plurality of electrical wires connecting the actuator module and the power converter; and
wherein the control module receives wireless lighting control signals, decodes the wireless lighting control signals, and controls the actuator module based on at least the decoded wireless lighting control signals, thereby controlling the electrical power supplied by the power converter to the lamp.

13. The wireless controller of claim 12, further comprising a control housing defining an enclosure for the control module and defining a male fitting for mounting the control housing to an opening defined through the fixture housing.

14. The wireless controller of claim 13, wherein the enclosure comprises a cylinder having a diameter greater than a length.

15. The wireless controller of claim 12, further comprising an actuator housing enclosing the actuator module and for mounting the actuator housing inside the fixture housing.

16. The wireless controller of claim 12, wherein the control module further includes a user interface.

17. The wireless controller of claim 12, wherein:
the actuator module further includes an AC to DC converter; and
the AC to DC converter powers the actuator module and the control module.

18. The wireless controller of claim 12, wherein the actuator module includes a load switching circuit to electrically couple one of an electrical power source to the power converter and the power converter to the lamp.

19. The wireless controller of claim 12, wherein the actuator module includes a power monitoring circuit to monitor the power drawn by at least one of the lamp and the power converter.

20. The wireless controller of claim 12, wherein the actuator module includes a dimming control circuit electrically coupled to a dimming input of the power converter.

21. The wireless controller of claim 12, further comprising:
a sensor module for mounting to an exterior of the fixture housing, the sensor module electrically coupled to the control module to provide a sensor output signal; and
wherein the controller of the control module further controls the actuator module based on the sensor output signal.

22. The wireless controller of claim 12, wherein:
the first circuit board also includes the power converter; and
the second plurality of electrical wires are defined by the single circuit board.

23. A wireless controller for a lighting fixture having a fixture housing, a lamp, and a power converter, the wireless controller comprising:
an actuator module including a first circuit board having an AC to DC converter, a power monitoring circuit, and a power controller circuit for controlling electrical power supplied by the power converter to the lamp;
a control module including a second circuit board having a radio, an antenna, a user interface, and a controller, the control module powered by the AC to DC converter;
a first plurality of electrical wires connecting the control module and the actuator module;
a second plurality of electrical wires connecting the actuator module and the power converter;
a control housing defining an enclosure for the control module and defining a male fitting for mounting the control housing to an opening defined through the fixture housing; and
an actuator housing enclosing the actuator module and for mounting the actuator housing inside the fixture housing; and
wherein the control module receives wireless lighting control signals, decodes the wireless lighting control signals, and controls the actuator module based on at least the decoded wireless lighting control signals, thereby controlling the electrical power supplied by the power converter to the lamp.

24. The wireless controller of claim 23, wherein the actuator housing houses both the actuator module and the power converter.

25. The wireless controller of claim 24, wherein:
the actuator module and the power converter are provided on a single circuit board; and
the second plurality of electrical wires are defined by the single circuit board.

* * * * *